United States Patent [19]
Jacobs et al.

[11] Patent Number: 5,862,262
[45] Date of Patent: Jan. 19, 1999

[54] METHOD OF ENCODING A DIGITAL IMAGE USING ADAPTIVE PARTITIONING IN AN ITERATED TRANSFORMATION SYSTEM

[75] Inventors: Everett W. Jacobs; Roger D. Boss, both of San Diego; Yuval Fisher, La Jolla, all of Calif.

[73] Assignee: The United States of America as represented by the Secretary of the Navy, Washington, D.C.

[21] Appl. No.: 859,782

[22] Filed: Mar. 30, 1992

[51] Int. Cl.$^6$ ................................................. G06K 9/36
[52] U.S. Cl. ........................... 382/249; 348/397; 348/438
[58] Field of Search ...................... 382/56, 14; 358/426, 358/430, 433, 133, 135, 136

[56] References Cited

U.S. PATENT DOCUMENTS

| | | | |
|---|---|---|---|
| 4,365,273 | 12/1982 | Yamada et al. ............................. | 382/56 |
| 4,409,623 | 10/1983 | Kobayashi et al. ...................... | 358/433 |
| 4,831,659 | 5/1989 | Miyaoka et al. ........................... | 382/56 |
| 4,941,193 | 7/1990 | Barnsley et al. . | |
| 5,065,447 | 11/1991 | Barnsley et al. ........................... | 382/56 |

OTHER PUBLICATIONS

Jacquin, "Fractal Image Coding Based on a Theory of Iterated Contractive Image Transforms" Oct. 1990 pp. 227–239.
Wu et al, "Image Coding by Adaptive Tree–Structured Segmentation" 1991 pp. 73–82 DCC '91.

Primary Examiner—Leo Boudreau
Assistant Examiner—Chris Kelley
Attorney, Agent, or Firm—Harvey Fendelman; Michael A. Kagan; Peter A. Lipovsky

[57] ABSTRACT

A method of encoding a digital image using adaptive partitioning in an iterated transformation image compression system is provided. A set of ranges R is initialized to include at least two uncovered ranges. A set of domains D is initialized to include only one member which is the entire image area.

For each uncovered range in the set R: A transformation is generated for each domain in the set of domains. Each domain is transformed into corresponding transformed images to map onto each uncovered range in the set R. Each domain's transformation is optimized and is indicative of a domain's corresponding optimized transformation image for an associated uncovered range. Each optimized transformation image is compared with the associated uncovered range to provide error data as a function of the difference therebetween. The associated uncovered range is redefined as a covered range when the error data for the associated uncovered range is within predefined limits. The covered range is then added to the set of domains D. The associated uncovered range is partitioned into a plurality of non-overlapping image areas. Partitioning is based upon the features of the image bounded by the associated uncovered range and takes place when the error data for the associated uncovered range exceeds the predefined limits. Each of the non-overlapping image areas is added to the set R of uncovered ranges and the associated uncovered range is added to the set of domains D.

The steps of generating, transforming, optimizing, comparing, redefining, partitioning and adding are repeated to select a set of covered ranges, domains and corresponding optimized transformations. The set of covered ranges form a non-overlapping tiling of the image and some iterate of the set of selected transformations is contractive. Information that identifies the set of covered ranges, domains and corresponding optimized transformations is stored compactly in an addressable memory.

9 Claims, 3 Drawing Sheets

METHOD OF ENCODING A DIGITAL IMAGE USING ADAPTIVE PARTITIONING IN AN ITERATED TRANSFORMATION SYSTEM

STATEMENT OF GOVERNMENT INTEREST

The invention described herein may be manufactured and used by or for the Government of the United States for governmental purposes without the payment of any royalties thereon or therefor.

This patent application is copending with our related patent application entitled "Method of Encoding a Digital Image Using Iterated Image Transformations to Form an Eventually Contractive Map" filed on the same date as subject patent application.

FIELD OF THE INVENTION

The present invention relates to the field of digital image compression, and more particularly to a method of encoding a digital image using adaptive partitioning in an iterated transformation system.

BACKGROUND OF THE INVENTION

Advances in computer hardware and software technology have brought about increasing uses of digital imagery. However, the amount of memory necessary to store a large number of high resolution digital images is significant. Furthermore, the time and bandwidth necessary to transmit the images is unacceptable for many applications. Accordingly, there has been considerable interest in the field of digital image compression.

The basic elements of a digital image compression system are shown schematically in FIG. 1, and are referenced by those elements contained within dotted line box 100. A digitized image is processed by an encoder 101 to reduce the amount of information required to reproduce the image. This information is then typically stored as compressed data in a memory 102. When the image is to be reconstructed, the information stored in memory 102 is passed through a decoder 103.

The goal of a good compression method implemented by encoder 101 is to attain a high compression ratio with minimal loss in fidelity. One of the latest approaches to the image compression problem has been put forth by Arnaud Jacquin in a paper entitled "Fractal Image Coding Based on a Theory of Iterated Contractive Image Transformations", appearing in The International Society for Optical Engineering Proceedings Volume 1360, Visual Communications and Image Processing, October 1990, pp. 227–239.

As is known in the art, fractal image generation is based on the iteration of simple deterministic mathematical procedures that can generate images with infinitely intricate geometries (i.e. fractal images). However, to use these fractal procedures in digital image compression, the inverse problem of constraining the fractal complexity to match the given complexity of a real-world image must be solved. The "iterated transformation" method of Jacquin constructs, for each original image, a set of transformations which form a map that encodes the original image. Each transformation maps a portion of the image (known as a domain) to another portion of the image (known as a range). The transformations, when iterated, produce a sequence of images which converge to a fractal approximation of the original image.

In order for a transformation to map onto some portion of the original image within a specified error bound, the transformation must be optimized in terms of position, size and intensity. If the transformation cannot be optimized within the specified error bound for a given set of ranges and domains, predefined subdivisions of the ranges are selected. The search for an optimized transformation then continues using these subdivisions. One method of predefining the subdivisions is known as quad-tree partitioning which divides a square sized range in a fixed way. Essentially, the range is subdivided into four equally sized squares without considering any of the image's features.

Thus, the need exists for a method of adaptively partitioning the image in an iterated transformation system based upon the features of the image. Accordingly, it is an object of the present invention to provide a method of encoding a digital image in an iterated transformation system by using adaptive partitioning in determining suitable ranges and domains to encode the image. Another object of the present invention is to provide a method of encoding a digital image in an iterated transformation system that adjusts to the features of the image during its partitioning process.

SUMMARY OF THE INVENTION

In accordance with the present invention, a method of encoding a digital image using adaptive partitioning in an iterated transformation image compression system is provided. The digital image is represented by an array of pixels defining an entire image area. Each pixel is defined by a three-dimensional vector identifying the position of the pixel in the array and an intensity level of the pixel. A set of ranges R is initialized to include at least two uncovered ranges. Each uncovered range is a section of the entire image area such that the union of the uncovered ranges tile the entire image. A set of domains D is initialized to include only one member which is the entire image area. For each uncovered range in the set R, a transformation is generated for each domain in the set of domains. The transformation comprises a 3×3 matrix identifying positional scaling coefficients and an intensity scaling coefficient, and a 3×1 vector identifying positional offset coefficients and an intensity offset coefficient. Each domain is transformed into corresponding transformed images scaled in size and intensity, based upon each domain's transformation, to map onto each uncovered range in the set R. For each uncovered range in the set R, each domain's transformation is optimized in terms of the intensity scaling and offset coefficients. An optimized transformation is indicative of a domain's corresponding optimized transformation image for an associated uncovered range. For each uncovered range in the set R, each optimized transformation image is compared with the associated uncovered range to provide error data as a function of the difference therebetween. For each uncovered range in the set R, the associated uncovered range is redefined as a covered range when the error data for the associated uncovered range is within predefined limits. The covered range is then added to the set of domains D. For each uncovered range in the set R, the associated uncovered range is partitioned into a plurality of non-overlapping image areas. Partitioning is based upon the features of the image bounded by the associated uncovered range and takes place when the error data for the associated uncovered range exceeds the predefined limits. For each uncovered range in the set R, each of the non-overlapping image areas is added to the set R of uncovered ranges. The associated uncovered range is added to the set of domains D. The steps of generating, transforming, optimizing, comparing, redefining, partitioning and adding are repeated to select a set of covered ranges, domains and corresponding optimized transformations. The set of covered ranges form a non-overlapping tiling of the image and some iterate of the set of selected transformations is contractive. Information that identifies the set of covered ranges, domains and corresponding optimized transformations is stored compactly in an addressable memory.

DESCRIPTION OF THE PREFERRED EMBODIMENT

Figure 1:
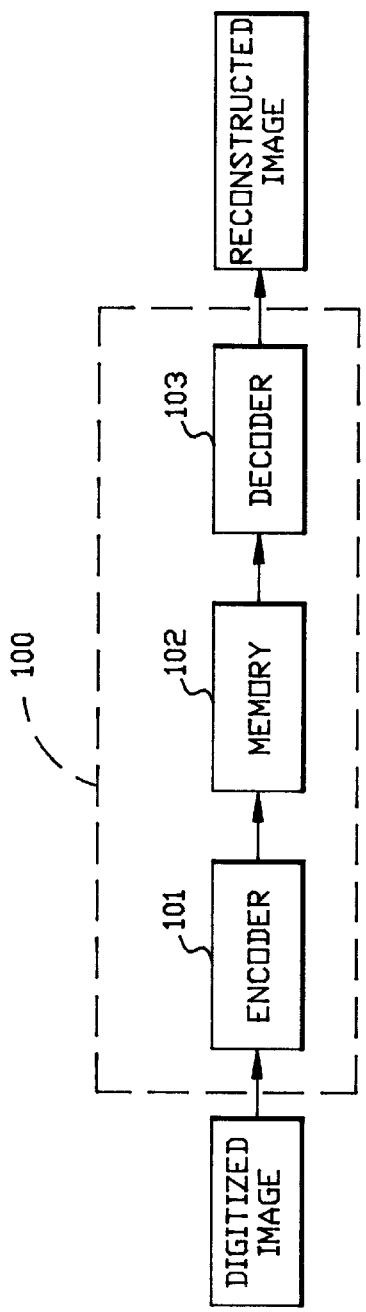
FIG. 1 is a schematic of the basic elements of a digital image compression system.

A digital image is defined by an array of individual pixels. Each pixel has its own level of brightness which, for monochrome images, has many possible gray levels, not just black or white. Thus, this type of image can be thought of as a three-dimensional object where each pixel has (x,y) positional coordinates and an intensity value coordinate z. As is known in the field of image compression, collections of these pixels can contain redundant information. Thus, image compression techniques remove such redundant information from an image (i.e., encode an image) in such a way that, after storage or transmission, the redundant information can be put back into the image (i.e., decode an image) resulting in a facsimile, or an approximation of the original collection of pixels.

The goal of fractal image encoding is to store an image as the fixed point of a map $W: F \rightarrow F$ from a complete metric space of images F, to itself. The space F can be taken to be any reasonable image model (collections of pixels), such as the space of bounded measurable functions on the unit square, etc. In this model, $f(x,y)$ or z represents the gray level of a pixel at the point $(x,y)$ in the image. The mapping W, or some iterate of W, is a contraction to insure rapid convergence to a fixed point upon iteration from any initial image. The goal is to construct the mapping W with a fixed point "close" (based on a suitable metric) to a given image that is to be encoded, and such that the map W can be stored compactly. Let $I=[0,1]$ and $I^m$ be the m-fold Cartesian product of I with itself. Let F be the space consisting of all graphs of real Lebesgue measurable functions $z=f(x,y)$ with $(x,y,f(x,y)) \in I^3$. A simple metric that can be used to measure fidelity is the sup metric $\delta_{sup}$ $$\delta_{sup}(f,g) = {}_{(x,y) \in I^2}{}^{sup} |f(x,y) - g(x,y)| \qquad (1)$$

Other metrics, such as the rms metric $\delta_{rms}$ $$\delta_{rms}(f,g) = [\int_{I^2} (f(x,y) - g(x,y))^2]^{1/2} \qquad (2)$$

have more complicated contractivity requirements. The rms metric is particularly useful since it can be easily minimized by performing standard regression of the algorithmic parameters. In the remainder of this description, the metric will be specified when relevant.

Since a typical digital image may be divided into a plurality of collections of pixels containing redundant information, the map W is constructed from local transformations $w_i$. Each local transformation $w_i$ is a transformation that maps one image area containing pixels (or domain $D_i$) from the image onto another image area containing pixels (or range $R_i$) from the image. Arriving at the best set of domains for a particular image is the goal of the present invention. Here, the "best" set is one which achieves a desired level of compression at the highest achievable level of fidelity, or a desired level of fidelity at the highest achievable level of compression.

As a first step in an iterated transformation encoding method, the digital image is defined as a plurality of data points having (x,y,z) coordinates that are stored in a computer memory. According to the principles of the iterated transformation process, domains (i.e., a domain $D_i$ being a section of the image area containing a collection of pixels) are mapped onto ranges (i.e., a range $R_i$ being a section of the image area containing a collection of pixels) according to the parameters of the local transformations. Thus, for a range $R_i$, a domain $D_i$ and corresponding local transformation $w_i$ are sought that will minimize the error between the image over $R_i$ and the transformation of the image over $D_i$. By adhering to the principles of the iterated transformation process, a set of transformations (and corresponding domains) are obtained that, when iterated from any initial starting point, will converge to a fixed point that approximates the desired image. The set of ranges, domains and transformations therefore encode the image. Thus, to store or transmit the image, only information defining the ranges, domains and transformations need be stored or transmitted. From the ranges, domains and transformations, an approximation to the original image can be constructed (decoded). If the ranges, domains and transformations can be defined more compactly than the original image, then image compression is attained.

Figure 2:
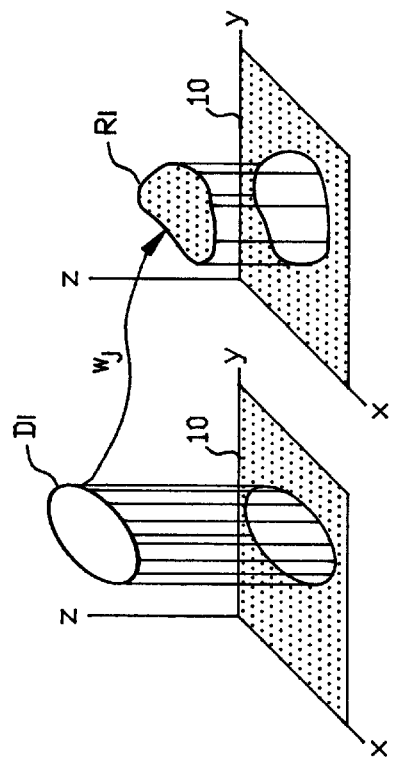
FIG. 2 is a graphical representation of the mapping process according to the present invention.

A graphical representation of the above described mapping process is shown in FIG. 2 where the x,y,z coordinate system is used to define a domain $D_i$ which is a subset of the area that comprises the entire image area 10. As is evident from FIG. 2, $D_i$ is a portion of the image area 10 which contains pixels at various levels of gray as indicated by the z component thereof. A transformation $w_i$ is chosen such that the domain $D_i$ can map onto a range $R_i$ which is another subset of the image area 10.

Thus, the overall transformation map W is defined as $$W = \bigcup_{i=1}^{n} w_i \qquad (3)$$

The transformations $w_1, \ldots, w_n$ (i.e., the map W) must tile the image. This means that each $D_i$ defines a part of the image to which $w_i$ is restricted. When $w_i$ is applied to this part, the result maps onto a range $R_i$. The $R_i$ must be non-overlapping and the union of the $R_i$'s must cover the image. Given W, it is easy to find the image that it encodes. Simply begin with any image $f_0$ and successively compute $W(f_0), W(W(f_0)), \ldots$ until the images converge to $|W|$. However, the converse is considerably more difficult for a given image f, i.e., how can a mapping W be found such that $|W|=f$? Essentially, an image $f \in F$ is sought such that $\delta(f,f')$ is minimal with $f'=|W|$. Given equation (3), it is reasonable to seek domains $D_1, \ldots, D_n$ and corresponding transformation $w_1, \ldots, w_n$ such that $$f \approx W(f) = \bigcup_{i=1}^{n} w_i(f) \qquad (4)$$

Equation (4) says that the transformations $w_i$, when applied to f, should result in f. The local transformations $w_1(f), \ldots, w_n(f)$ are said to cover the image f. Equality of equation (4) would imply that $f=|W|$. Being able to exactly cover f with parts of itself is not likely, so the best possible cover is sought with the hope that $|W|$ and f will not look too different, i.e., that $\delta(|W|,f)$, the error using an appropriate metric, is small.

Thus, the encoding process can be summarized as follows: For each range $R_i$, a transformation $w_i$ restricted to a domain $D_i$ is sought such that the error (measured by an appropriate metric) between the result of applying $w_i$ to the image, and the part of the image over $R_i$, is minimized. This is called "covering" the range. The map W is specified by the transformations $w_i$ and their corresponding domains $D_i$. The $w_i$'s must tile the image, and must be chosen such that some iterate of W is contractive.

A form for the transformations $w_i$, which is convenient for encoding a gray scale image is, $$w_i \begin{bmatrix} x \\ y \\ z \end{bmatrix} = \begin{bmatrix} a_i & b_i & 0 \\ c_i & d_i & 0 \\ 0 & 0 & s_i \end{bmatrix} \begin{bmatrix} x \\ y \\ z \end{bmatrix} + \begin{bmatrix} e_i \\ f_i \\ o_i \end{bmatrix} \qquad (5)$$

where, for each pixel in $D_i$, $a_i$, $b_i$, $c_i$ and $d_i$ are positional scaling coefficients for transforming the position of the pixel;

$s_i$ is the intensity scaling coefficient for transforming the gray level of the pixel;

$e_i$ and $f_i$ are positional offset coefficients for the pixel; and $o_i$ is an intensity offset coefficient for the pixel.

The only restriction on the transformations is that the map W (or some iterate of W) must be contractive. This could be assured under the metric of equation (1) by requiring that, for all $w_i$, $$s_i < 1 \qquad (6)$$

Here, contractivity refers to contractivity in the z direction.

In the present invention, choosing a set D of all possible domains from which the $D_i$'s are chosen, and a set R of all possible ranges from which the $R_i$'s are chosen, is accomplished by adaptive partitioning based on features of the image to be encoded. Accordingly, "adaptive partitioning" in the present invention is adaptive in a more general way than methods such as the aforementioned quad-tree partitioning. A general description of the adaptive partitioning according to the present invention will now be presented.

The goal in choosing R and D is to have domains that cover ranges well. Therefore, it would be advantageous to partition the image such that this goal is likely to be achieved. In the prior art quad-tree type partitioning, selecting one of the predefined subdivisions occurs when good coverings cannot be found, but the positions of the subdivisions are not adaptive. A current range square is simply divided into four equally sized squares without considering the features of the image. In the adaptive partitioning process of the present invention, subdividing occurs when good coverings cannot be found, but the subdivision positions are chosen based on the features of the image. Divisions are made so that the features of the newly created ranges are such that there will be domains which can efficiently cover them. For this to be possible, the domains must also be adaptively defined. This is facilitated in the present invention by having D defined by the identical partitioning that defines R. This is a fundamental change from the prior art where D is a predefined set.

Partitioning in the present invention is performed concurrently with the process of selecting transformations that encode the image. Accordingly, the encoding process of the present invention could simply begin with one domain encompassing the entire image area and a few (e.g., two) ranges, the union of which is the entire image area. If a transformation cannot be found to map the one domain onto one of the ranges, the range is subdivided. Specifically, the range is subdivided into a few (e.g., two) sections, where the positions of the subdivisions are adaptive to the content of the image. Thus, the larger range is replaced with smaller ranges. The set of possible domains is increased by the large (just subdivided) range. If a transformation is found that covers the range, the covered range is added to the set of domains. Thus, by defining the ranges and the domains by the same partition, the information required to define the map that encodes the image is reduced.

In the present invention, choosing the location of the partitions is done such that both ranges and domains are created in a way that the domains are likely to cover the ranges efficiently (i.e., the domain set D contains fewer members and still results in good coverings). Furthermore, because the ranges are efficiently covered by the domains, fewer ranges are required to fully cover the image. Thus, even though such an adaptive partitioning method must store more information per domain and range (i.e., per transformation) than simpler quad-tree partitioning, the reduction in the number of transformations can reduce the total amount of information which must be stored.

The partitioning of the image describes the geometry of the ranges and domains thereby partially defining the map W, and therefore must be stored as part of the encoded image. Storing the partitioning information compactly is simple and is well known in the art. It may be stored as a sequence of information denoting the orientation of the partitions, and an offset value that determines the position of the partitions at each step. As the rectangles get smaller, fewer bits are required to store the offset so that the memory cost decreases as more rectangles are added. Naturally, to define the $w_i$'s, it is also necessary to store information identifying the symmetry operation (i.e., the positional coefficients) used in transforming the domains onto the ranges, the intensity scale coefficient and the intensity offset coefficient. The above described encoding procedure may be carried out to achieve: 1) the best attainable fidelity (defined by the error metric) for a predetermined target compression, 2) the best attainable compression for a predetermined target fidelity, or 3) a balance between the two.

As an example of a method of partitioning, the image can be subdivided so that edge-like features in the image, indicative of changes in intensity level, tend to run diagonally through (or along the edges of) ranges and domains. A specific example of this type of partitioning, called HV-partitioning, is described further hereinbelow.

The HV-partitioning scheme derives its name from the horizontal and vertical partitions that it makes. Unlike the quad-tree methods which divide a square in a fixed fashion, HV-partitioning provides for variable partitioning of rectangles. Each partitioning step consists of partitioning a rectangle either horizontally or vertically into two rectangles. When a rectangle that contains a horizontal or vertical edge is partitioned, the partition occurs along the strongest such edge. If a rectangle contains other edges, the partition should occur in such a way that the edge intersects one of the generated rectangles at its corner, with the other rectangle not containing this edge. This tends to result in rectangles which either contain no edges, or rectangles that have edges which run diagonally across the rectangle.

As described above, according to the HV-partitioning scheme the set D is dynamic and changes before each new range rectangle is processed. The change in the set D is that the last rectangle processed is added to D. Since this tends to create domains with no edges or edges that run diagonally, it is likely that choosing domains in this fashion will result in domains that cover the ranges well using the transformation matrix given in equation (5). This is true for the following reason.

The transformation maps a rectangle (i.e., domain) with a given size and aspect ratio onto a rectangle (i.e., range) of different size and aspect ratio. An edge feature running diagonally through a domain rectangle (or along the edge of the domain rectangle) will also run diagonally through the transformed domain rectangle (or along the edge of the transformed domain rectangle). Since the partition is made so that the range rectangles also have the most prominent edge features running diagonally (or along an edge), the likelihood of the image features in the transformed domain matching the image features in the range is improved. As a result of the improved probability that a given domain will cover a range well, the number of domains necessary to achieve a good encoding using the HV-partitioning scheme is considerably less than the number of domains necessary for quad-tree partitioning. In addition, this also means that larger ranges are more likely to be covered well, thus reducing the number of transformations needed. The reduction in the number of ranges and domains necessary to encode the image compensates for the greater amount of memory (per transformation) required to store encoding information produced as a result of the HV-partitioning.

Figure 3A:
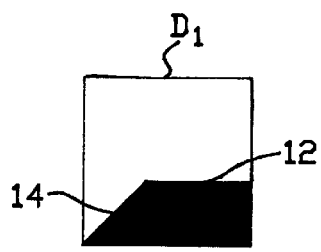
FIGS. 3(a)–3(g) depict a simple image that is encoded by the method of the present invention.

Referring to FIGS. 3(a)–3(g), a description of the present invention by means of a tutorial example will now follow. FIG. 3(a) is a simple image with only two levels of intensity (i.e., black and white) which is to be encoded. The "black" regions are represented in FIGS. 3a–3g by dotted areas. The image contains two edge features 12 and 14 as they will be referred to hereinafter. Each "edge feature" is indicative of a change in image (i.e., pixel) intensity along some edge of an image feature.

Figure 3B:
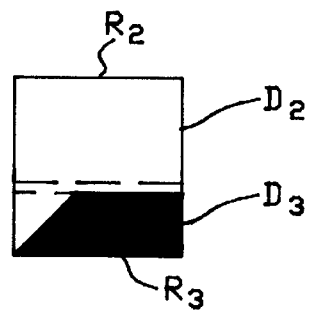

According to the present invention, the entire image area is the first range $R_1$ in a set of ranges R. Proceeding according to the HV-partitioning scheme described above, the image is adaptively subdivided such that the most prominent edge feature 12 in the image runs along the edge of the subdivision. The resulting two image areas are new ranges $R_2$ and $R_3$ as shown in FIG. 3(b). Finding the position where this edge is located is carried out using methods well known in the art. For example, in this image, values of adjacent pixels (not shown) in the image could be summed. Pixel values would then be summed vertically and horizontally. Edge feature 12 would be detected by computing successive differences of the vertical sums. Note that if edge feature 12 were a vertical feature, it would be detected by computing successive differences of the horizontal sums.

Figure 3C:
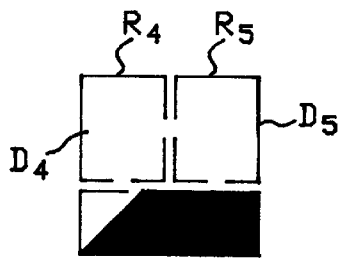
Figure 3D:
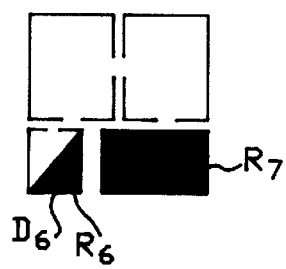
Figure 3E:
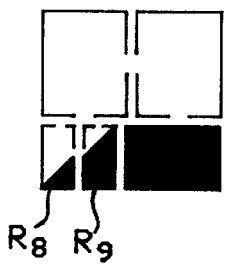

The image area just subdivided, in this case the entire image area or range $R_1$, is added to the set of domains D. Since this is the first domain being added to the set D, it is designated as $D_1$ as shown in FIG. 3(a). A domain and transformation are now sought which cover the uncovered ranges (i.e., $R_2$ and $R_3$). However, the only domain in the set D is $D_1$, and since it does not cover $R_2$ or $R_3$ well, partitioning continues as shown in FIG. 3(c). Here $R_2$ (which contains no edge features at all) is subdivided in half resulting in two new ranges $R_4$ and $R_5$. As before, the image area just subdivided (i.e., $R_2$) is added to the domain set D as $D_2$. Since $R_3$ cannot be covered by $D_1$ or $D_2$, it is subdivided. In this case, the subdivision is adaptively positioned such that one of the rectangles resulting from the subdivision has no edge feature, and the other rectangle resulting from the partition has a diagonal edge-like feature. This is illustrated in FIG. 3(d) where it is apparent that edge feature 14 runs diagonally through a rectangle. As before, the image area just subdivided (i.e., $R_3$) is added to the domain set D as $D_3$. A domain and transformation are now sought to cover the uncovered ranges $R_4$, $R_5$, $R_6$ and $R_7$.

The ranges $R_4$ and $R_5$ can be covered by $D_2$. Therefore, $R_4$ and $R_5$ are: 1) marked as covered, 2) added to the domain set D as $D_4$ and $D_5$, and 3) information defining the transformations and corresponding domain are saved. A domain and transformation are now sought that will cover the ranges $R_6$ and $R_7$. The range $R_7$ can also be covered with $D_2$, so it is marked as covered and the appropriate information is saved. The encoding procedure continues on in a similar fashion to partition $R_6$ into $R_8$ and $R_9$ (FIG. 3(e)), and $R_8$ into $R_{10}$ and $R_{11}$ (FIG. 3(f)).

Figure 3F:
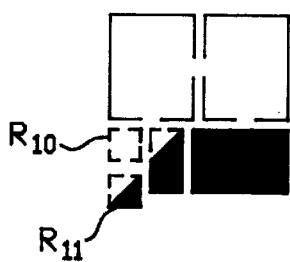
Figure 3G:
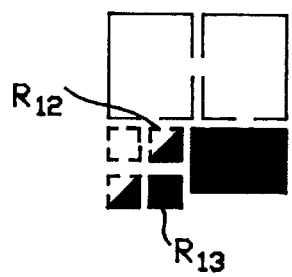

In FIG. 3(f) it is apparent that $R_{10}$ can be covered with $D_2$, and $R_{11}$ can be covered with $D_6$. Finally, the last necessary partition is shown in FIG. 3(g) where $R_9$ is partitioned into $R_{12}$ and $R_{13}$. Here it is apparent that $R_{12}$ can be covered by $D_6$, and $R_{13}$ can be covered by $D_2$. The covered ranges $R_4$, $R_5$, $R_7$, $R_{10}$, $R_{11}$, $R_{12}$ and $R_{13}$ tile the image area. The transformations and corresponding domains that cover these ranges form a contractive map W that encodes the image.

It is clear that a description of the partitioning of the image must be included in defining the map W. Accordingly, storing such an adaptive partition requires more memory per subdivision than simpler partitioning techniques. However, this simple example illustrates how adaptive partitioning can result in a small number of subdivisions that define a small number of ranges and domains that accurately encode the image. Therefore, encodings with good compression and fidelity can be attained.

The above simple example explains the operation of the present invention.

Mapping domains onto ranges is slightly more complex using HV-partitioning as compared with quad-tree partitioning. In the quad-tree schemes, domains are typically chosen to be larger by an integer multiple so that averaging transformed domain pixels onto a range pixel is easy. In the HV-partitioning scheme, proper averaging is computationally expensive. One alternative is to simply choose a representative domain pixel for each range pixel. Another alternative, leading to better results at the expense of computation time, is to average only those domain pixels that map wholly within a range pixel, and to ignore those that contribute a fraction of their whole value.

An important consideration which arises in the HV-partitioning scheme is contractivity in the xy plane. Contractivity in the xy plane means that for any two points in the xy plane, the distance between the points measured in an appropriate metric is larger before the transformation than after. Contractivity of the $w_i$'s in the xy plane is not required because $$I^2 = \bigcup_{i=1}^{n} R_i \qquad (7)$$

In the HV-partitioning scheme, there are far fewer domains to choose from and the domains are rectangular, not square. Therefore, requiring less xy contractivity (or relaxing the xy contractivity completely) can significantly increase the domain pool for a given range, thereby increasing the likelihood of finding a good covering. However, note that if the condition of equation (6) (i.e., contractivity in the z direction) is not imposed, relaxing xy contractivity reduces the likelihood that the encoding process will result in an eventually contractive map W as described in Applicants' previously referenced copending application.

Figure 5:
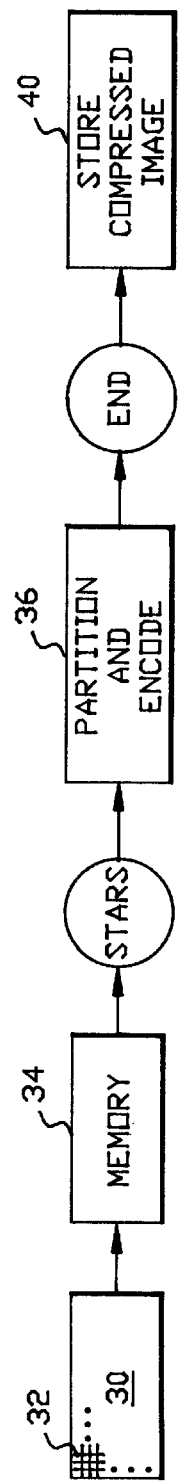
FIG. 5 is a schematic configuration of an apparatus for carrying out the method of the present invention.
Figure 6:
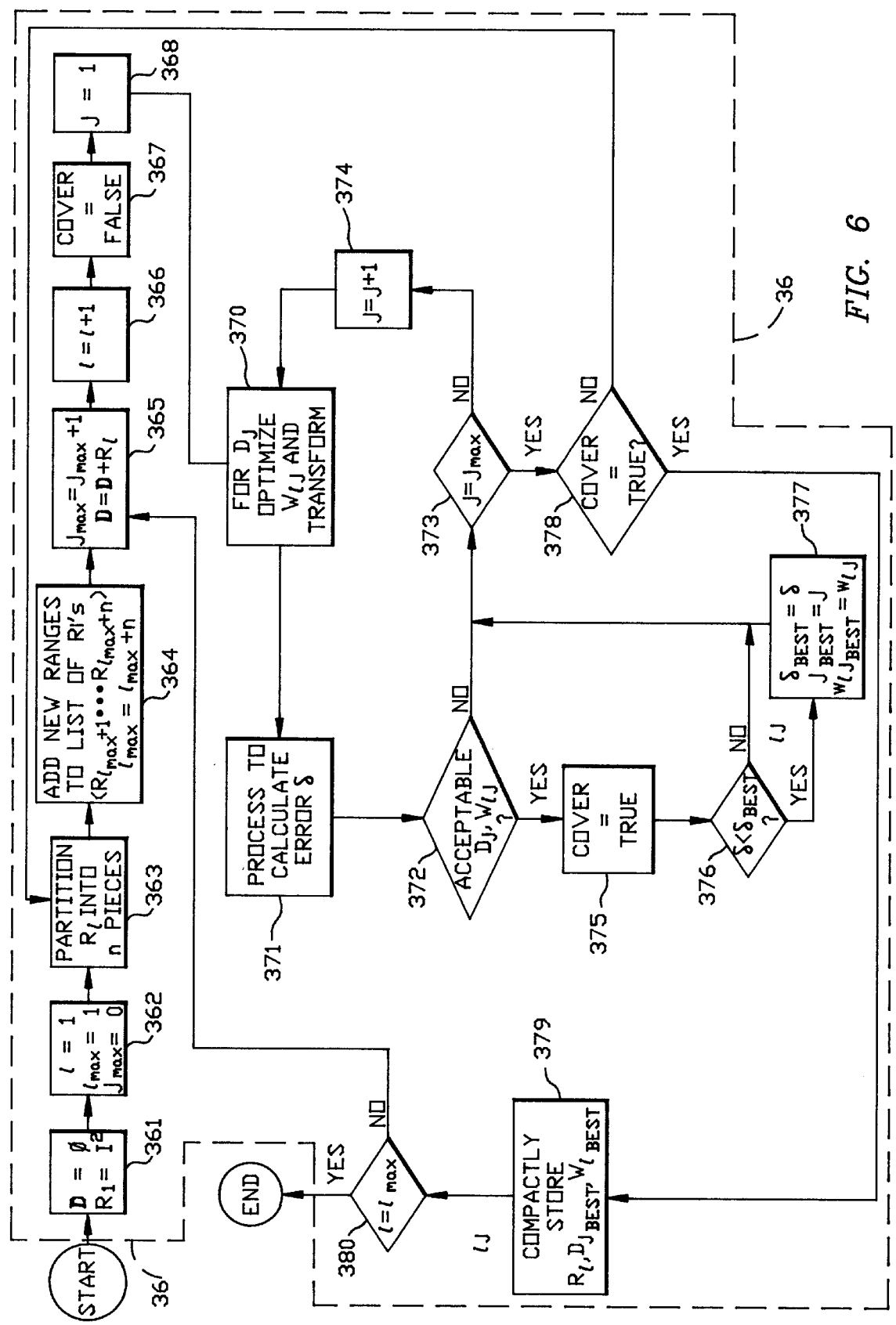
FIG. 6 is a more detailed schematic configuration of the encoder of FIG. 5.

Referring to FIGS. 5 and 6, a schematic of an apparatus for carrying out the method of the present invention is shown. It is to be understood that these diagrams are provided to explain the basic aspects of the present invention, and therefore do not include details that have been described previously herein. In addition, the method of the present invention is not restricted to a particular computer architecture as will be readily apparent to one skilled in the art. A digital image 30 to be encoded is defined by an array of individual pixel elements 32. As mentioned above, each pixel element is defined by (x,y,z) coordinates indicative of pixel position and intensity and is stored in a memory 34. An encoder 36 generates the encoded image.

Referring to FIG. 6, encoder 36 will now be explained in greater detail. An initializer 361 initializes the domain set D to be empty (ø), and the first range $R_1$ to be the entire image area $I^2$. An initializer 362 initializes indices i, $i_{max}$ and $j_{max}$. The index i identifies the range currently being processed, the index $i_{max}$ marks the last range that has to be processed, and the index $j_{max}$ is the current total number of domains. A partitioner 363 adaptively partitions the image into n (e.g., two) pieces. Partitioner 363 accomplishes this based on the features of the image using a method such as the HV-partitioning scheme. An incrementer 364 adds the new ranges created by partitioner 363 to the list of ranges, and increments $i_{max}$ by the selected number of pieces n. An incrementer 365 adds ranges that have been subsequently partitioned by partitioner 363 (and covered ranges) to the list of domains, and increments the total number of current domains $j_{max}$. An incrementer 366 increments i to the current range. A controller sets a "COVER" indicator to "FALSE" indicating that an acceptable domain and transformation has not yet been found to cover the current range. For the current range, an acceptable covering is sought using each domain in the domain list. Accordingly, the current domain index j is first set to 1 at an initializer 368.

The process of finding an acceptable covering begins at optimizer and transformer 370. The optimizer and transformer 370 calculates the optimal transformation $w_{ij}$, and transforms the image over $D_j$ to map onto $R_i$. The error $\delta$, between the section of the image over $R_i$ and the result of applying $w_{ij}$ to the section of the image over $D_j$, is calculated at a processor 371. At a comparator 372, the xy-contractivity and error are compared with predefined criteria to determine if $D_j$ and $w_{ij}$ are acceptable. If $D_j$ and $w_{ij}$ are not acceptable, the current domain index j is checked against the current total number of domains $j_{max}$ at a comparator 373. Assuming that j does not equal $j_{max}$, j is incremented at an incrementer 374. The process then repeats with the next domain at optimizer and transformer 370.

If $D_j$ and $w_{ij}$ are acceptable, the "COVER" indicator is set to "TRUE" at controller 375. At comparator 376, the error $\delta$ is compared with the error ($\delta_{BEST}$) for the best previously found domain and transformation for the current range. If the current domain and transformation result in a smaller error than the previous best domain and transformation, then $\delta$, j and $w_{ij}$ are stored in a temporary memory 377 as the new best domain and transformation. This process is repeated until j equals $j_{max}$ indicating that all the current domains have been processed.

After all current domains have been processed, the "COVER" indicator is checked at a comparator 378. If the "COVER" indicator is "FALSE", indicating that no acceptable covering was found for the current set of domains, the process returns to partitioner 363. The current range then is partitioned into smaller ranges and the process repeats beginning with the next range in the list of ranges. If the "COVER" indicator is "TRUE", indicating that an acceptable covering was found from the current set of domains, information defining the current range and the best domain and transformation are compactly stored in a memory 379. Note that this step requires storing information that describes how the image was partitioned by partitioner 363. Therefore, this step, along with the partitioning step performed by partitioner 363, are particularly relevant to the adaptive partitioning method.

If there are still ranges to be covered, comparator 380 directs the process to incrementer 365, which adds the just covered range to the domain list and repeats the process for the next range in the list of ranges. If the last range required to encode the image has been covered (i.e., $i=i_{max}$), the encoding process ends. Returning to FIG. 5, the results of partitioner and encoder 36 are stored in a memory 40.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A method of data compression for compressed data storage or transmission over a data link of compressed data representing an image, said image being comprised of an array of pixels, each pixel having a position in said array, comprising the steps of:

acquiring a digital image that is a digital representation of said image, said digital image being represented by an array of pixel values defining an entire image area, each pixel value being defined by a three-dimensional vector identifying the position of the pixel in the array and an intensity level of the pixel;

defining at least one partition in said digital representation of said image based upon the intensity levels of each of said pixels in said image area so as to create a plurality of ranges which are to be encoded, each range being a section of said entire image area, there being a union of said ranges, wherein said union of said ranges tile said entire image area, thereby deriving a digital representation of each said partition;

using said digital representation of each said partition to identify each partitioned image area as a member of a set of domains;

generating for each range which is to be encoded a transformation for each member of said set of domains, said transformation comprising positional scaling coefficients and an intensity scaling coefficient, and further comprising positional offset coefficients and intensity offset coefficients;

using each said transformation to transform the corresponding member of said set of domains into a corresponding transformed digital image scaled in size and intensity to map onto each range which is to be encoded;

optimizing each said transformation in terms of the intensity scaling and offset coefficients, wherein an optimized transformation is indicative of a corresponding optimized transformed digital image for the associated range;

comparing each said optimized transformed digital image with the associated range to provide error data as a function of the difference therebetween;

redefining each range which is to be encoded as an encoded range when at least one of said error data for the range is within predefined limits and adding said encoded range to said set of domains;

defining for each range which is still to be encoded following said step of redefining at least one additional partition in said digital representation of said range which is still to be encoded based upon the intensity level of each of said pixels in said image area encompassed by said range which is still to be encoded so as to create a plurality of non-overlapping image areas thereby deriving a digital representation of each said additional partition;

adding each range which is still to be encoded following said redefining step to said set of domains;

creating a new set of ranges which are to be encoded comprising said plurality of non-overlapping image areas;

repeating said steps of generating using each said transformation, optimizing, comparing, redefining, defining, adding and creating to select a set of encoded ranges, domains and corresponding optimized transformations, wherein said set of encoded ranges form a non-overlapping tiling of said entire image area such that some iterate of the set of selected set of transformations is contractive so as to create a digital representation of the entire partition comprising each said partition and each said additional partition; and storing in an addressable memory information that represents said image by said digital representation of said entire partition, said set of encoded ranges, domains and corresponding optimized transformations.

2. A method according to claim 1 wherein said step of defining comprises the steps of:

locating edge features in each associated range which is still to be encoded following said step of redefining wherein an edge feature is indicative of intensity change in each associated range which is still to be encoded following said step of redefining, wherein the greatest level of intensity change is indicative of a prominent edge feature; and dividing each associated range which is still to be encoded following said step of redefining into two adjacent rectangles having a common lengthwise side, wherein at least one of the rectangles does not contain the prominent edge feature.

3. A method according to claim 2 wherein the prominent edge feature forms at least a portion of the common lengthwise side of the rectangles.

4. A method according to claim 2 wherein one of the rectangles contains the prominent edge feature.

5. A method according to claim 4 wherein the prominent edge feature intersects a corner of the one rectangle containing the prominent edge feature.

6. A method according to claim 1 wherein the transformation for a domain $D_i$ from the set of domains D is defined as $w_i(x,y,z)$ and is of the form $$w_i \begin{bmatrix} x \\ y \\ z \end{bmatrix} = \begin{bmatrix} a_i & b_i & 0 \\ c_i & d_i & 0 \\ 0 & 0 & s_i \end{bmatrix} \begin{bmatrix} x \\ y \\ z \end{bmatrix} + \begin{bmatrix} e_i \\ f_i \\ o_i \end{bmatrix}$$

where, for a pixel in $D_i$, $a_i$, $b_i$, $c_i$ and $d_i$ are positional scaling coefficients for transforming the position of the pixel;

$s_i$ is the intensity scaling coefficient for transforming a gray level of the pixel;

$e_i$ and $f_i$ are positional offset coefficients for the pixel; and $o_i$ is an intensity offset coefficient for the pixel.

7. A method according to claim 6 wherein xy contractivity as determined by the positional scaling coefficients is not restricted to be contractive.

8. A method according to claim 7 wherein the intensity scaling coefficient is restricted to be less than one.

9. The method of claim 1 wherein said transformation comprises a 3×3 matrix identifying said positional scaling and intensity scaling coefficients, and a 3×1 vector identifying said positional offset and intensity offset coefficients.

* * * * *